(12) United States Patent
Ming

(10) Patent No.: US 7,551,802 B2
(45) Date of Patent: Jun. 23, 2009

(54) MAP IMAGE MATCHING METHOD AND APPARATUS

(75) Inventor: Wei Ming, Cupertino, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 665 days.

(21) Appl. No.: 11/231,770

(22) Filed: Sep. 22, 2005

(65) Prior Publication Data

US 2007/0065041 A1 Mar. 22, 2007

(51) Int. Cl.
*G06K 9/36* (2006.01)

(52) U.S. Cl. .................................. 382/284; 382/294

(58) Field of Classification Search ................ 382/284, 382/282, 294; 345/619, 634, 636; 350/450
See application file for complete search history.

(56) References Cited

U.S. PATENT DOCUMENTS

| | | | | |
|---|---|---|---|---|
| 5,774,824 A | * | 6/1998 | Streit et al. | ................ 701/207 |
| 5,982,951 A | * | 11/1999 | Katayama et al. | ........... 382/284 |
| 6,757,445 B1 | * | 6/2004 | Knopp | ....................... 382/285 |
| 6,865,289 B1 | * | 3/2005 | Berestov | ..................... 382/154 |
| 6,885,776 B2 | * | 4/2005 | Takakura et al. | ............ 382/284 |
| 7,339,614 B2 | * | 3/2008 | Gruber et al. | ............ 348/218.1 |
| 2002/0041717 A1 | * | 4/2002 | Murata et al. | ............... 382/275 |
| 2003/0147558 A1 | * | 8/2003 | Loui et al. | .................. 382/225 |

* cited by examiner

*Primary Examiner*—Andrew W Johns
(74) *Attorney, Agent, or Firm*—Finnegan, Henderson, Farabow, Garrett & Dunner LLP

(57) ABSTRACT

The present application relates to an image processing apparatus and a method for matching and combining two map images with at least some overlap area. In some embodiments, color features of a first map image data and a second map image data are extracted and areas of matching color are determined. Border features in areas of matching color in the image data for the first and second maps may be extracted and map areas common to the first map image data and the second map image data may be determined based on the areas of matching color and the border features. Feature points of map areas common to the first and second maps may be extracted and the first map image data and the second map image data may be combined using common feature points.

10 Claims, 7 Drawing Sheets

MAP IMAGE MATCHING METHOD AND APPARATUS

FIELD

The present invention relates to a method and/or an apparatus which matches several map images having at least a common area.

INTRODUCTION

Usually, a map image is a large image. It is often difficult to copy or print due to the size. To make easier to copy or print the map, the map image can be divided into small images. However, the divided small map images typically exhibit certain drawbacks. For example, it is difficult to get an appropriate map image when an area where the user wants to look at is divided into two different small map images.

Therefore, it is desirable that it is easy to correctly match two divided map images having at least some overlap area.

SUMMARY

According to various embodiments, the present teachings can provide an image processing apparatus. The image processing apparatus can match two map images, a first map image data and a second map image data, having at least some overlap area. The image processing apparatus can comprise a color matching area finding unit, a common area finding unit, a feature point finding unit and a map combining unit.

The color matching area finding unit can extract color features of the first map image data and the second map image data, and decide color matching areas of the first map image data and the second map image data based on the color feature. The color matching areas have the same color in the first map image data and the second map image data.

The common area finding unit can extract border features of the color matching areas of the first map image data and the second map image data, and decide common areas of the first map image data and the second map image data based on the color matching area and the border features. The common areas have same border features in the color matching areas of the first map image data and the second image area.

The feature point finding unit can extract feature points of the common areas of the first map image data and the second map image data.

The map combining unit can combine the first map image data and the second map image data according to the feature points.

DESCRIPTION OF CERTAIN EMBODIMENTS

An Image Processing Apparatus

Figure 1:
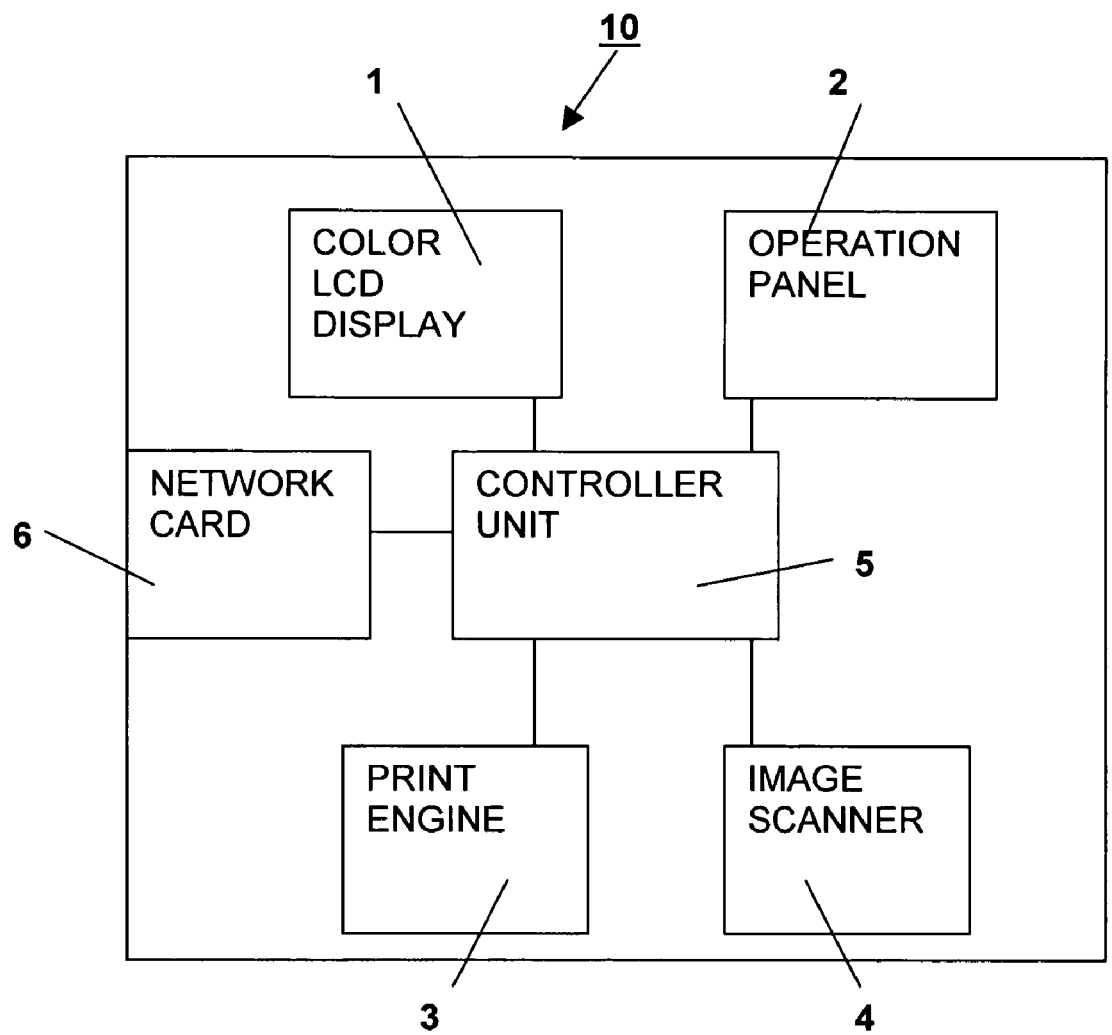
FIG. 1 illustrates a block diagram of an image processing apparatus according to certain embodiments.

An image processing apparatus can match at least two map images, a first map image data and a second map image data, having at least some overlap area. In certain embodiments, the image processing apparatus can match more than two map images.

The map image data is a color bitmap image of a map. Preferably, the map image data is divided into several color areas representing each province (e.g., a city, a county, a state, a prefecture, a country and the like). The map image data can include detailed image of a road, a building, a railroad, a station and so on. The map image data can include letters (e.g., a name of the city, the county, the state, the prefecture, the country, a name of the building, the station, the road, the railroad and the like).

Examples of an image processing apparatus for matching two map images consistent with certain embodiments of the invention include, but are not limited to, a personal computer (PC) with an application software for matching two map images, an image scanner, a digital color copying apparatus and a color multi functional printer (MFP). The digital color copying apparatus and the color multi functional printer can print by a way of a laser beam printing with color toners, an ink jet printing with color ink, a thermal printing with thermal dye and/or a silver halide printing with silver halide light sensitive color material.

The image processing apparatus can comprise a control unit, a color matching area finding unit, a common area finding unit, a feature point finding unit and/or a map combining unit. The image processing apparatus can further comprise an input unit, an image reading unit and/or a display unit. The image processing apparatus can further comprise a print unit, a storing unit and/or a transmit unit.

In certain embodiments, the application software for matching two map images can be installed into the image processing apparatus. In certain embodiments, the application software can be recorded in a computer readable medium. Examples of the computer readable medium consistent with certain embodiments of the invention include, but are not limited to, a digital memory card, a compact disk (e.g., CD-R, CD-RW, etc.), and a digital versatile disk (e.g., DVD-R, DVD-RW, DVD+RW, etc.). Various types of digital memory cards compatible with certain embodiments of the invention include, but are not limited to, a secure digital (SD) memory card, Compact Flash™, Smart Media™, Memory Stick™, and the like.

In certain embodiments, the control unit can control the entire system of the image processing apparatus and/or the various units in the image processing apparatus. The control unit can run various software including the application software for matching two map images. The control unit can process and/or calculate several data. Example of the control unit consistent with certain embodiments of the invention include, but are not limited to, a central processing unit (CPU) or a micro processing unit (MPU) with a memory and the application software necessary for the processing, and an integrated circuit (IC), an application specific integrated circuit (ASIC), a field programmable gate array (FPGA) and a programmable logic device (PLD) with the memory and the application software, if necessary. Example of the memory consistent with certain embodiments of the invention include, but are not limited to, a random access memory (RAM) including NVRAM, M RAM, P RAM, Fe RAM, Flash RAM, and a read only memory (ROM).

In certain embodiments, the image reading unit can obtain the first map image data and the second map image data. In certain embodiments, the image reading unit can scan an original first map image and an original second map image and obtain the first map image data and the second map image data. In certain embodiments, the image reading unit can read a removable data recording medium in which the first map image data and the second map image data are recorded and obtain the first map image data and the second map image data. In certain embodiments, the image reading unit can receive the first map image data and the second map image data transmitted from the other device connected with the image processing apparatus through a network (e.g., a local area network, an internet, a wide area network and the like) and obtain the first map image data and the second map image data. Example of the image reading unit consistent with certain embodiments of the invention include, but are not limited to, an image scanner, a removable data recording medium recorder/reader, a network card and a LAN adaptor. Examples of a removable data recording medium for the removable data recording medium recorder/reader include, but are not limited to, a digital memory card, a compact disk (e.g., CD-R, CD-RW, etc.), and a digital versatile disk (e.g., DVD-R, DVD-RW, DVD+RW, etc.). Various types of digital memory cards compatible with certain embodiments of the invention include, but are not limited to, a secure digital (SD) memory card, Compact Flash™, Smart Media™, Memory Stick™, and the like.

In certain embodiments, the display unit can display various images and texts including the first map image, the second map image, the combined map image, the instruction of the map matching, the warning message showing combining two map images is impossible and the like. Examples of the display unit consistent with certain embodiments of the invention include, but are not limited to, a liquid crystal display (LCD), a Braun tube, a cathode ray tube (CRT) and a plasma display panel. Preferably, the display unit can display color image.

In certain embodiments, the user can input various data, information, response or instruction (e.g., a selection of map matching mode, an instruction to start scanning and/or printing and the like) to the image processing apparatus through the input unit of the image processing apparatus. Examples of the input unit consistent with certain embodiments of the invention include, but are not limited to, a keyboard, a mouse, a push button, a touch panel and an operation panel.

In certain embodiments, the transmit unit of the image processing apparatus can transmit various data (e.g., the combined map image data and the like) and various signal from the image processing apparatus to the other device connected to the image processing apparatus and can receive various data (e.g., the first map image data, the second map image data and the like) and various signal from the other device connected with the image processing apparatus. Examples of the transmit unit consistent with certain embodiments of the invention include, but are not limited to, a LAN adapter, a modem and a network card.

In certain embodiments, the storing unit of the image processing apparatus can store several software including the application software for matching two map images. In certain embodiments, the storing unit can store several data including the first map image data, the second map image data, the combined map image data, the color feature, the color matching area, the border feature, the common area, the feature point and the like. Example of the storing unit consistent with certain embodiments of the invention include, but are not limited to, a hard disk, a memory (e.g., a RAM including NVRAM, M RAM, P RAM, Fe RAM, Flash RAM, and a ROM) and a removable data recording medium recorder/reader.

In certain embodiments, the print unit of the image processing apparatus can print the combined map image, the first map image and/or the second map image on a recording sheet in color. For instance, the recording sheet can be a paper, OHP film and so on. Examples of the print unit consistent with certain embodiments of the invention include, but are not limited to, an image forming unit or a print engine for the laser beam color MFP or the color LBP, an ink jet head of the color IJP and a thermal head of the color thermal printer. In certain embodiments, the print engine or the image forming unit can comprise a laser beam scanning unit, a photo-sensitive drum (in other words, a photoconductor), a cleaning unit, an eraser lamp, a charging charger, a developing device, a transmit charger and so on. In certain embodiments, the image forming unit or the print engine for the color LBP, the color laser beam MFP can comprise one laser beam scanning unit and several imaging units corresponding to each color of C (cyan), M (magenta), Y (yellow) and K (black) and comprising the photo-sensitive drum, the cleaning unit, the eraser lamp, the charging charger, the developing device, the transmit charger and so on.

In certain embodiments, the color matching area finding unit can extract color features of the first map image data and the second map image data. The color feature can include an information about where and what color areas are located in the first map image data and/or the second map image data. In certain embodiments, the color matching area finding unit can extract the color feature by calculating color values (e.g., LAB, HSV and the like) of each color area of the first map image and the second map image.

In certain embodiments, the color matching area finding unit can decide at least one color matching area of the first map image data and the second map image data based on the color features after extracting the color features. The color matching area is a color area of the first map image data and the second map image data in which the first map image and the second map image have a same color. In certain embodiments, the color matching area finding unit can decide the color matching area by comparing the color value of each color area included in the first map image data and the second map image data. In certain embodiments, the color matching area finding unit can deem color areas of the first map image data and the second map image data having not exactly same color value but close color values as the color matching area. For instance, when the $\Delta E$ of two colors is not more than 8, the two colors can be deemed as a same color by the color matching area finding unit. Preferbly, $\Delta E$ is not more than 5.

$$\Delta E = \sqrt{(\Delta L^2 + \Delta a^2 + \Delta b^2)}$$

$$\Delta L = L1 - L2$$

$$\Delta a = a1 - a2$$

$$\Delta b = b1 - b2$$

LAB value of one color=(L1, a1, b1)
LAB value of the other color=(L2, a2, b2)

In certain embodiments, the common area finding unit can extract border feature of the color matching area of the first map image data and the second map image data. The border feature can include an information about the length of the border of the color matching area, the shape of the border of the color matching area, the angle formed by two borders of the color matching area and the like. In certain embodiments, after the common area finding unit even out the detailed irregularity of the border line, the common area finding unit can extract the border feature.

In certain embodiments, the common area finding unit can decide the common area of the first map image data and the second map image data. The color matching area of the first map image data and the color matching area of the second map image data having same border feature can be the common area. The common area finding unit can decide the common area by comparing the border feature of the color matching area in the first map image data with the border feature of the color matching area in the second map image data.

In certain embodiments, the feature point finding unit can extract feature points of the common areas of the first map image data and the second map image data. Preferably, the feature point finding unit can extract the several feature points. In certain embodiments, the feature point finding unit can extract feature point according to the algorithm of homography. In certain embodiments, the feature point finding unit can decide the feature points of the common areas by finding the feature points on the border line of the common area having same border feature between the first map image and the second map image. In certain embodiments, the feature point finding unit can decide the feature points of the common areas not on the border line, but in the detailed image of the first map image and the second map image such as the image of the road, the railroad, the building, the letter (e.g., the name of city and the like) and so on.

In certain embodiments, the map combining unit can combine the first map image data and the second map image data according to the feature points. The map combining unit can combine the first map image data and the second map image data so that the feature points of the first map image data can superimpose on the feature points of the second map image data.

Example of the color matching area finding unit, the common area finding unit, the feature point finding unit and the map combining unit with certain embodiments of the invention include, but are not limited to, a CPU or a MPU with a memory and the application software necessary for the processing, and an IC, an ASIC, a FPGA and a PLD with the memory and the application software, if necessary. The color matching area finding unit, the common area finding unit, the feature point finding unit and the map combining unit can be integrated into one device or can be divided into several devices. The color matching area finding unit, the common area finding unit, the feature point finding unit and/or the map combining unit can be integrated with the control unit.

EXAMPLE

One example of the method and the apparatus for matching several map images is described in the following. This invention is not limited to the following example.

In this embodiments, the image processing apparatus is a color multi function printer (MFP) 10. The color MFP 10 can have a function of a copying apparatus, a function of a printer and a function of a scanner. The color MFP 10 can print in color utilizing color toners of C(cyan), M(magenta), Y(yellow) and K(black). In certain embodiments, as illustrated in FIG. 1, the color MFP 10 can comprise the display unit (e.g., a color LCD display 1), the input unit (e.g., an operation panel 2), the print unit (e.g., a print engine 3), the image reading unit (e.g., an image scanner 4), the transmit unit (e.g., a network card 6), the control unit (e.g., a controller unit 5 comprising a CPU, a ROM and a RAM), the color matching area finding unit (e.g., the controller unit 5), the common area finding unit (e.g., the controller unit 5), the feature point finding unit (e.g., the controller unit 5) and the map combining unit (e.g., the controller unit 5). In this example, the control unit, the color matching area finding unit, the common area finding unit, the feature point finding unit and the map combining unit can be integrated into one controller unit 5. The print engine 3 can comprise four photoconductors for each of C, M, Y, and K and a laser emitting device. The application software for matching two map images can be stored in the ROM and/or the RAM of the controller unit 5.

Figure 2A:
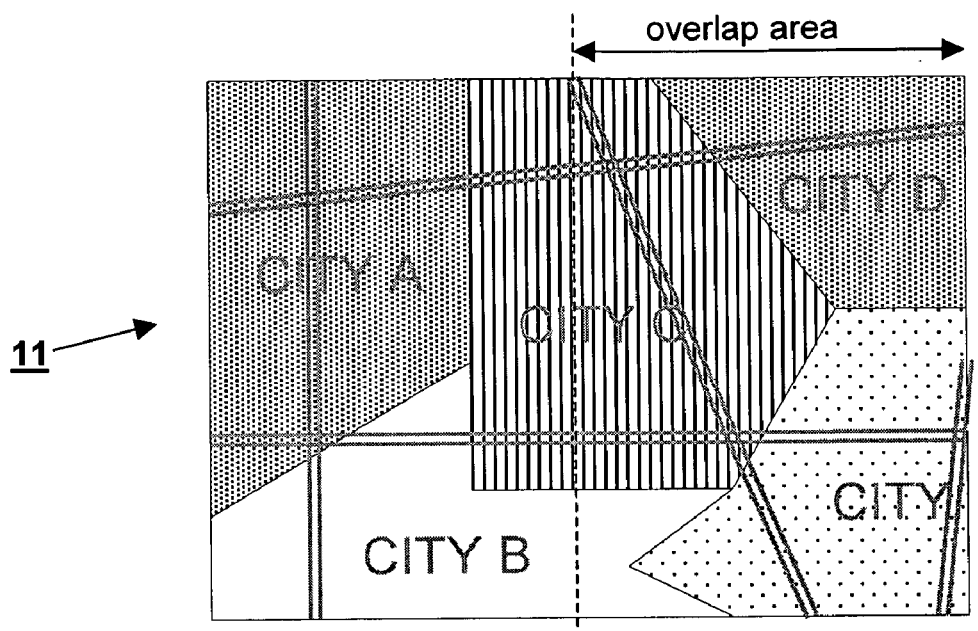
FIG. 2(a) and (b) illustrate a first map image data and a second map image data according to certain embodiments.
Figure 2B:
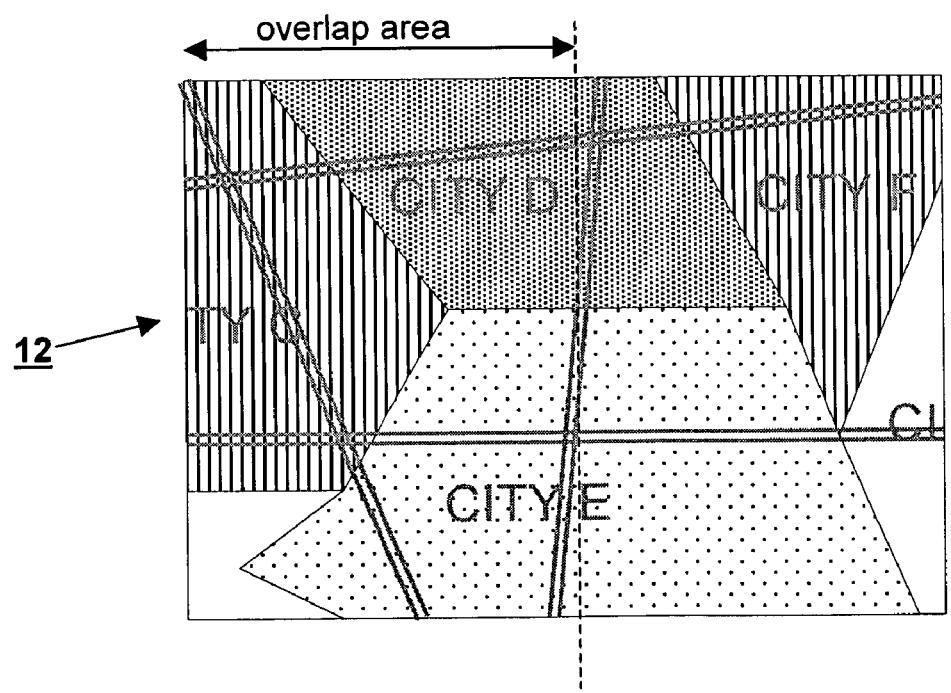

In this example, a first map image 11 and a second map image 12 can be combined into one map image. As illustrated in FIG. 2 (a) and (b), the two map images, the first map image 11 and the second map image 12, can have an overlap area. The first map image 11 can show five cities (e.g., a city A, B, C, D and E) which are color-coded, several roads and the name of each city. In the first map image 11, the color of the city A and the color of the city D are the same color, a blue. The color of the city B is yellow. The color of the city C is green. The color of the city E is pink. The second map image 12 can show six cities (e.g., a city B, C, D, E, F and G) which are color-coded, several roads and the name of each city. In the second map image 12, the color of the city B and the color of the city G are the same color, yellow, and the color of the city C and the color of the city F are the same color, green.

Figure 7:
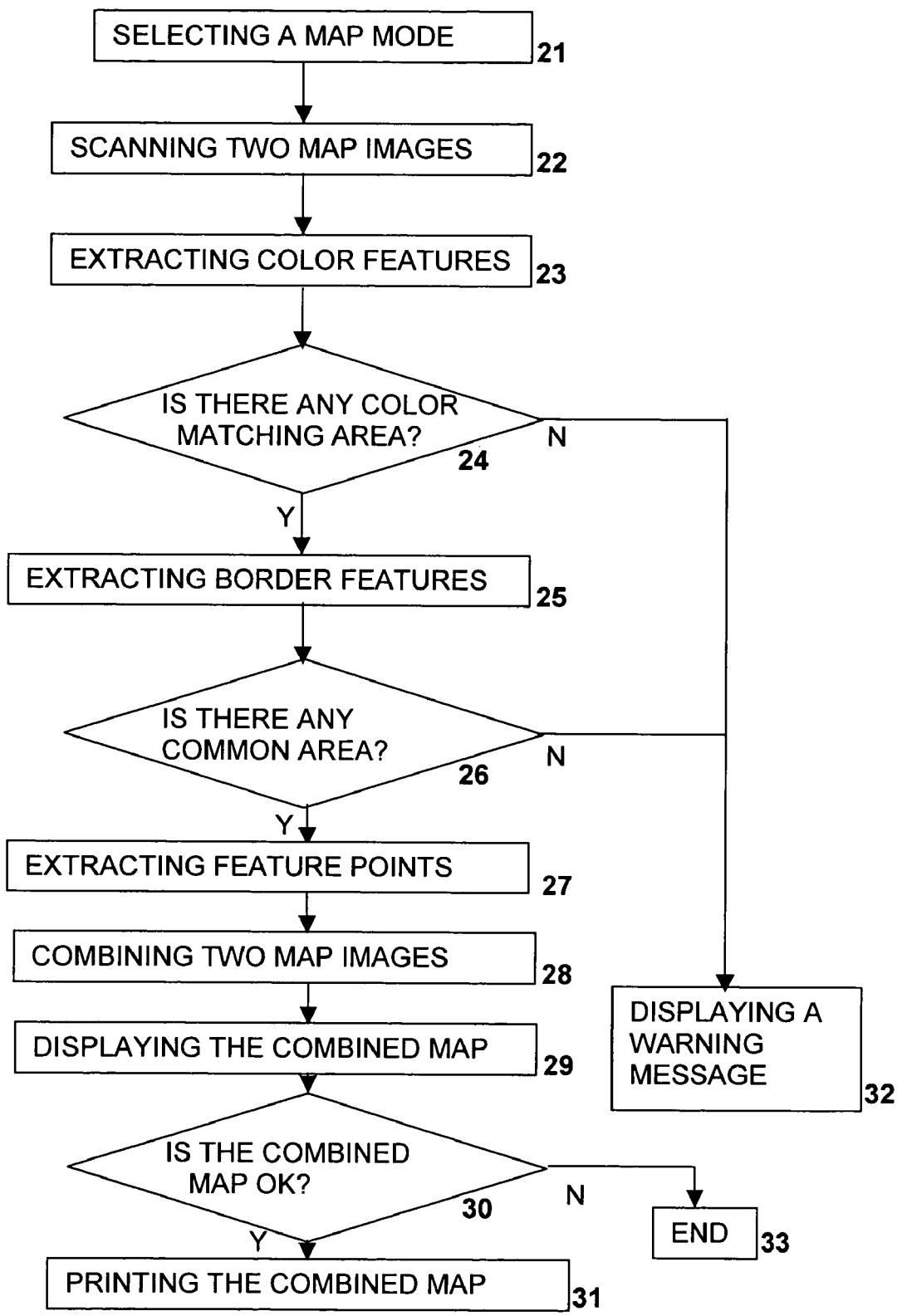
FIG. 7 illustrates a flowchart describing the matching of two map images according to certain embodiments.

If the user wants to combine two map images into one map image by the color MFP 10, the user can select "a map mode" by the operation panel 2. (21 in FIG. 7) In certain embodiments, the instruction about how to combine two map images can be displayed on the color LCD display 1 and the user can follow the instruction.

The first map image 11 and the second map image 12 can be scanned by the image scanner 4 of the color MFP 10. (22 in FIG. 7) By the scanning, the first map image data and the second map image data which are digital data can be obtained. The first map image data and the second map image data can be stored in the RAM of the controller unit 5.

In certain embodiments, if the first map image data and/or the second map image data skews, the skew can be corrected by conventional image processing. In certain embodiments, if one of the first map image data and the second map image data is up-side down, the up-side down image can be corrected by conventional image processing.

Figure 3A:
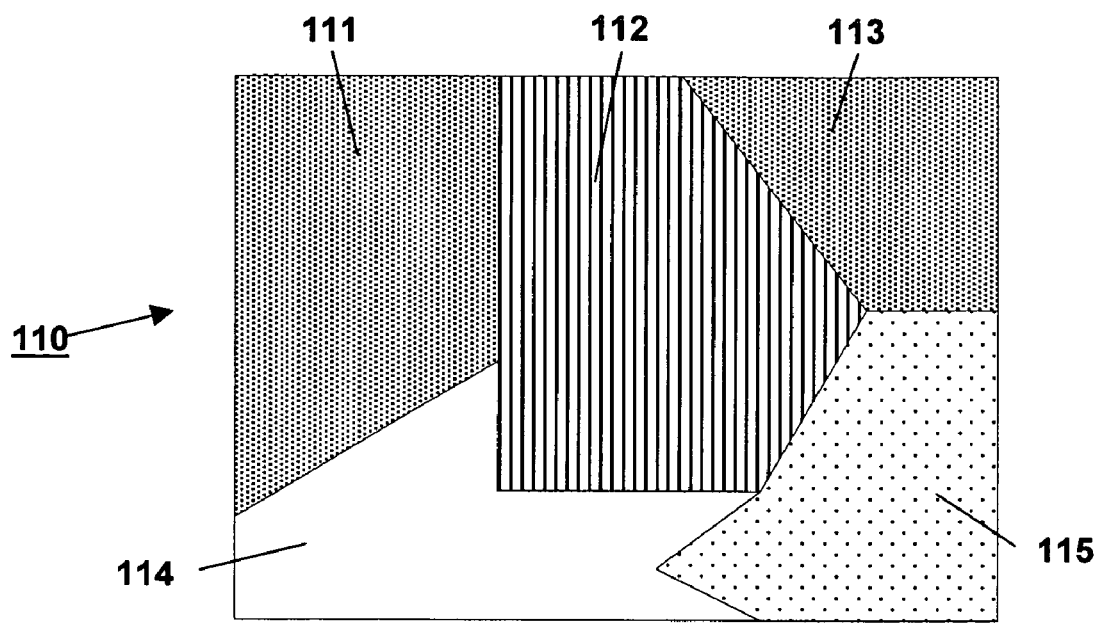
FIG. 3(a) and (b) illustrate a color feature of first map image data and a color feature of a second map image data according to certain embodiments.
Figure 3B:
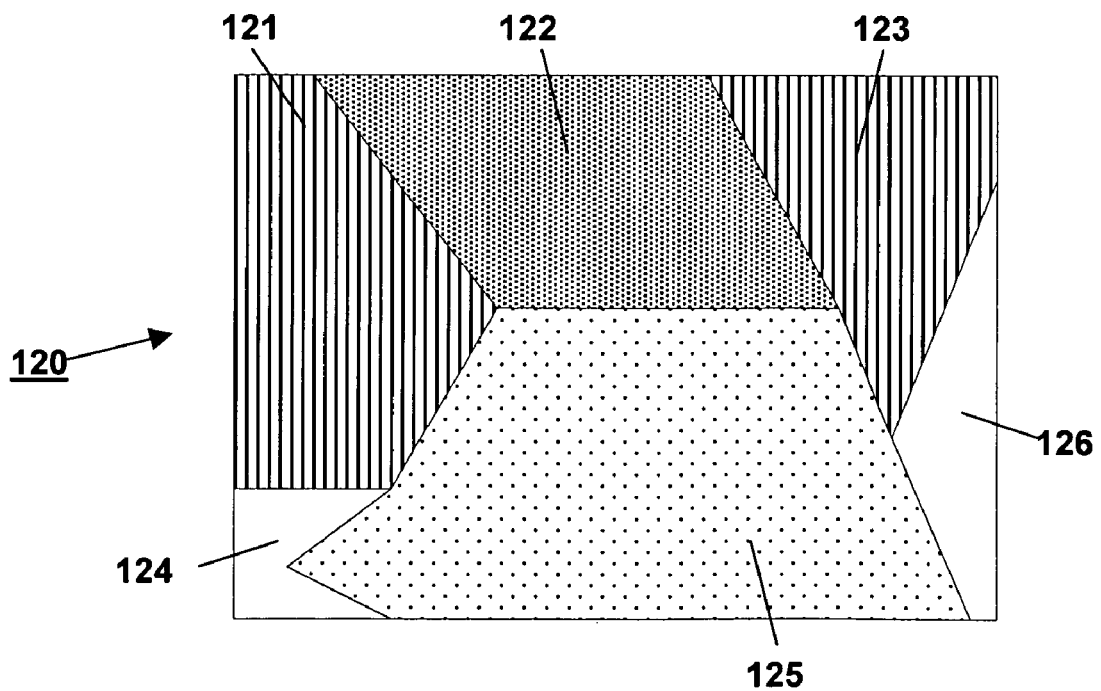

The controller unit 5 as the color matching area finding unit can extract the color feature of the first map image data 11 according to the application software stored in the controller unit 5. (23 in FIG. 7) By the controller unit's detecting where and what color areas are located in the first map image data, the color feature of the first map image data can be extracted. When the controller unit 5 extracts the color feature, detailed image such as the road and/or the printed city name can be ignored and the controller unit 5 can calculate each of the color value (e.g., a LAB) of the city area. In certain embodiments, a HSV can be used instead of the LAB. Calculating the LAB of each city area, as illustrated in FIG. 3(a) and (b), the color feature 110 of the first map image data can be extracted by the controller unit 5. The color feature 110 of the first map image data can be divided into five color areas 111, 112, 113, 114 and 115. The color feature 120 of the second map image data can be also extracted by the same way as the above. The color feature 120 of the second map image data can be divided into six color areas 121, 122, 123, 124, 125 and 126. The color of the color area 111, 113, 122 is blue. (e.g., LAB value of the blue is (30, 68, −112)) The color of the color area 112, 121, 123 is green. (e.g., LAB value of the green is (88, −79, 81)) The color of the color area 114, 124, 126 is yellow. (e.g., LAB value of the blue is (95, −6, 95)) The color of the color area 115, 125 is pink. (e.g., LAB value of the blue is (70, 46, −6)) The extracted color feature can be stored in the RAM of the controller unit 5.

Figure 4:
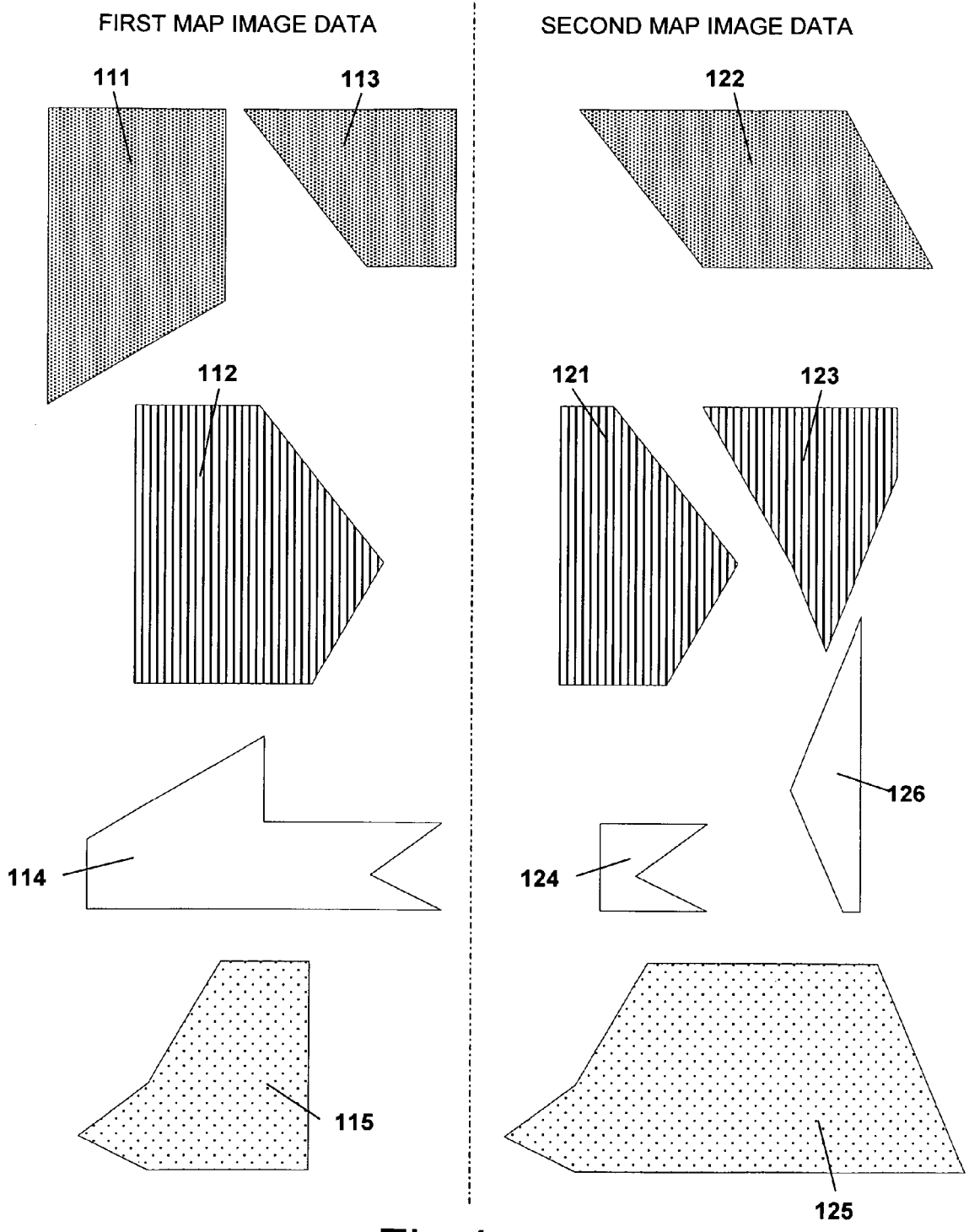
FIG. 4 illustrates color matching areas according to certain embodiments.

Next, the controller unit 5 can compare the color feature 110 of the first map image data with the color feature 120 of the second map image data according to the application software in order to decide the color matching area. (24 in FIG. 7) The color matching area is the color area in the color feature of the map image data which has similar color value to the other color area in the color feature of the other map image data. The controller unit 5 can decide the color matching area by detecting the color area in the color feature 110 of the first map image data whose color value is similar to the color value of the color area in the color feature 120 of the second map image data. In this example, the controller unit 5 can decide the color matching area as shown in Table A and FIG. 4.

TABLE A

| COLOR (LAB value) | COLOR MATCHING AREA | |
|---|---|---|
| | FIRST MAP IMAGE DATA | SECOND MAP IMAGE DATA |
| blue (30, 68, −112) | 111, 113 | 122 |
| green (88, −79, 81) | 112 | 121, 123 |
| yellow (95, −6, 95) | 114 | 124, 126 |
| pink (70, 46, −6) | 115 | 125 |

As shown in the Table A, for instance, the color area 111, 113 in the color feature of the first map image data and the color area 122 in the color feature of the second map image data are color matching area. The color matching area shown in Table A can be stored in the RAM of the controller unit 5.

If the controller unit 5 judges there is no color matching area between the first map image data and the second map image data, the color LCD display 1 can display a warning message stating that it is impossible to combine the two map images. (32 in FIG. 7)

Then, the controller unit 5 as the common area finding unit can extract border feature of the color matching area according to the application software stored in the controller unit 5. (25 in FIG. 7) For instance, the controller unit 5 can detect the border line of the color matching area 111, 113 and 122 and extract border features about how long the each border is, how much angle the two borders made and the like of the color matching area 111, 113 and 122. In this example, when the border feature is extracted, the border line itself is analyzed. In certain embodiments, after the detailed irregularity of the border line is evened out by the image processing, the border feature can be extracted.

Figure 5:
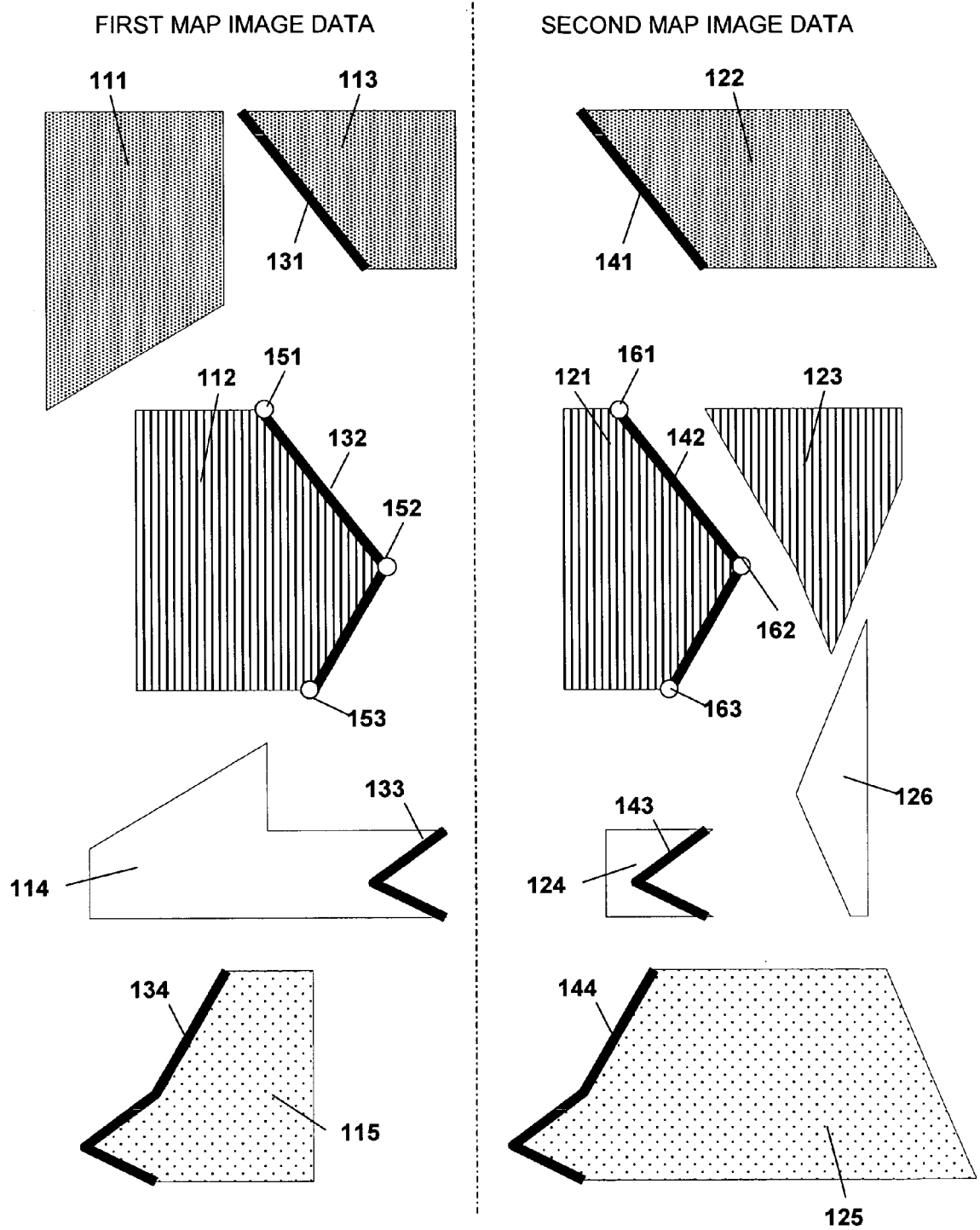
FIG. 5 illustrates color matching areas and a part of border features according to certain embodiments.
Figure 6:
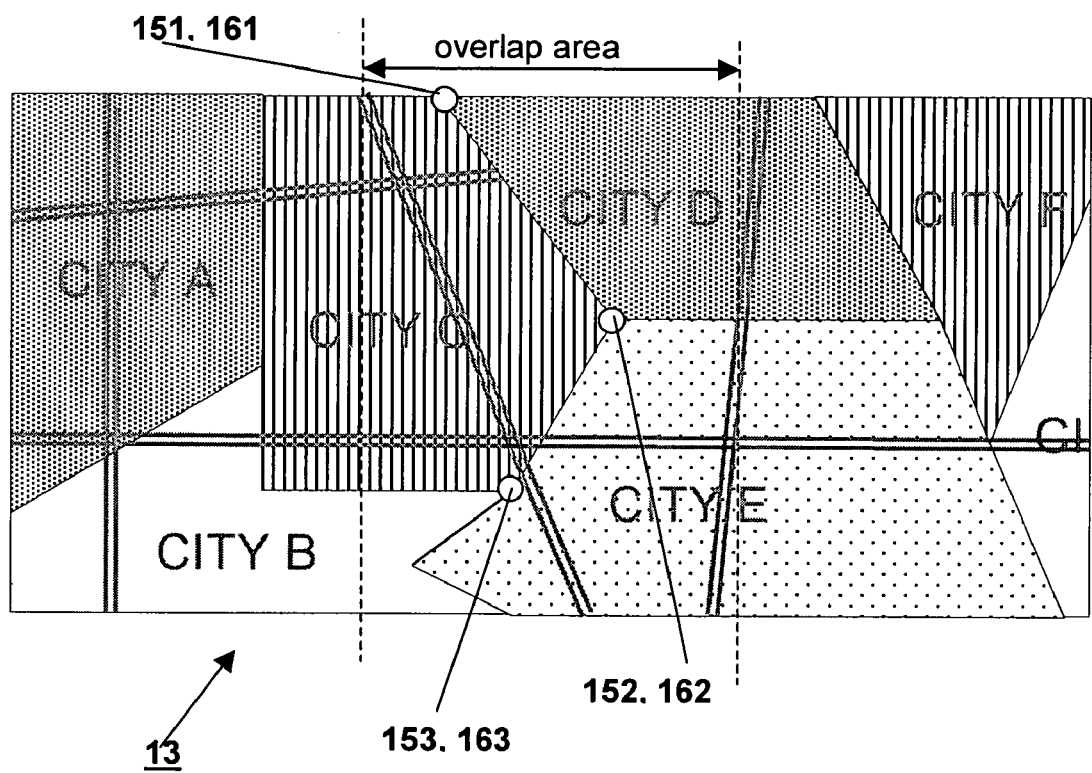
FIG. 6 illustrates a combined map image data according to certain embodiments.

Then, the controller unit 5 can compare the border feature of the color matching area 111, 113 of the first map image data with the border feature of the color matching area 122 of the second map image data in order to find the common area. (26 in FIG. 7) In this example as illustrated in FIG. 5, the controller 5 can detect that the border feature 131 of the color matching area 113 in the first map image data is similar to the border feature 141 of the color matching area 122 in the second map image data. Therefore, the controller 5 can decide the color matching area 113 in the first map image data and the color matching area 122 in the second map image data are the common area according to the application software stored in the RAM of the controller unit 5. Namely, the common area of the first map image data and the common area of the second map image data have a same color and at least one same border feature. The common area can be stored in the RAM of the controller unit 5.

In this example, the controller unit 5 can decide the common area as shown in Table B and FIG. 5.

TABLE B

| COLOR (LAB value) | COMMON AREA | |
|---|---|---|
| | FIRST MAP IMAGE DATA | SECOND MAP IMAGE DATA |
| blue (30, 68, −112) | 113 | 122 |
| green (88, −79, 81) | 112 | 121 |
| yellow (95, −6, 95) | 114 | 124 |
| pink (70, 46, −6) | 115 | 125 |

If the controller unit 5 judges there is no common area between the first map image data and the second map image data, the color LCD display 1 can display a warning message stating that it is impossible to combine the two map images. (32 in FIG. 7)

After finding the common area, the controller unit 5 as the feature point finding unit can extract the feature point of the common areas according to the application software stored in the RAM of the controller unit 5. (27 in FIG. 7) Preferably, the several feature points can be extracted. The feature points of the common areas can be found according to the algorithm of homography. The feature points of the common areas can be decided by finding the feature point of the border line of the common area having same border feature between the first map image and the second map image. For instance, the feature points 151, 152 and 153 in the common area 112 and the feature points 161, 162 and 163 in the common area 121 can be extracted as the corners of the border line having the same border feature of the common areas. In certain embodiments, the feature points of the common areas can be found not on the border line, but in the detailed image of the first map image and the second map image such as the image of the road, the printed letter (e.g., the name of city and the like) and so on. The feature points can be stored in the RAM of the controller unit 5.

After extracting the feature point, the controller unit 5 as the map combining unit can combine the first map image data 11 and the second map image data 12 according to the feature points. (28 in FIG. 7) The controller unit 5 can combine the first map image data 11 and the second map image data 12 by superposing the feature point 151, 152 and 153 in the common area 112 of the first map image data with the feature point 161, 162 and 163 of the common area 121 of the second map image data. More feature points in the other common area can be used for combining the first image data and the second image data. By superposing several feature points, it is possible to combine two map image data correctly.

The combined map image data 13 can be obtained by combining the first map image data and the second map image data according to the feature points. The combined map image data 13 can be stored in the RAM of the controller unit 5 and be displayed on the color LCD display 1. (29 in FIG. 7)

After the user confirm the combined map image 13 on the color LCD display 1, the user can instruct to start to print the combined map image 13 from the operation panel 2 if the user is satisfied with the combined map image 13. (30 in FIG. 7) If the user instructs to start to print the combined map image 13, the controller unit 5 can transmit the combined map image data from the RAM to the print engine 3 and make the print engine 3 print the combined map image 13 in color image. (31 in FIG. 7) For printing, the conventional way can be applied. If the user are not satisfied with the combined map image 13, the process ends. (33 in FIG. 7)

While the color MFP is utilized as the image processing apparatus to combine two map image data, the other device can be utilized as the image processing apparatus. In certain embodiments, the image scanner can combine two map image data like the above. In certain embodiments, the personal computer (PC) including the application software for matching map images can combine two map image data like the above.

In this example, the first map image and the second map image are rectangle shape. In certain embodiments, this invention can apply to also the first map image and/or the second map image of circle, ellipse and any irregular shape.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for matching two map images performed by an image processing device, with a first map image data and a second map image data, having at least some overlap area, the method comprising the image processing device implemented steps of: extracting color features of the first map image data and the second map image data,
   deciding color matching areas of the first map image data and the second map image data based on the color features, the color matching area having the same color in the first map image data and the second map image data,
   extracting border features of the color matching areas of the first map image data and the second map image data, wherein the border features include geometric features of the borders,
   deciding common areas of the first map image data and the second map image data based on the color matching area and the border features, the common areas having same border features in the color matching areas of the first map image data and the second map image data,
   extracting feature points of the common areas of the first map image data and the second map image data, and
   combining the first map image data and the second map image data according to the feature points.

2. The method of claim 1, wherein the step of extracting color feature is conducted by calculating color values of each areas of the first map image data and the second map image data.

3. The method of claim 2, wherein the color value is LAB or HSV.

4. The method of claim 1, wherein the step of extracting feature points is conducted according to an algorithm of homography.

5. The method of claim 1, wherein the image processing device is a computer.

6. A computer readable medium containing a computer program for matching two map images, a first map image data and a second map image data, having at least some overlap area, the program containing instructions for directing the computer to execute the steps of:
   extracting color features of the first map image data and the second map image data,
   deciding color matching areas of the first map image data and the second map image data based on the color features, the color matching area having the same color in the first map image data and the second map image data,
   extracting border features of the color matching areas of the first map image data and the second map image data, wherein the border features include geometric features of the borders,
   deciding common areas of the first map image data and the second map image data based on the color matching areas and the border features, the common areas having same border features in the color matching areas of the first map image data and the second map image data,
   extracting feature points of the common areas of the first map image data and the second map image data, and
   combining the first map image data and the second map image data according to the feature points.

7. An image processing apparatus for matching two map images, a first map image data and a second map image data, having at least some overlap area, comprising:
   a color matching area finding unit which extracts color features of the first map image data and the second map image data, and decides color matching areas of the first map image data and the second map image data based on the color feature, the color matching areas having the same color in the first map image data and the second map image data,
   a common area finding unit which extracts border features of the color matching areas of the first map image data and the second map image data, and decides common areas of the first map image data and the second map image data based on the color matching area and the border features, the common areas having same border features in the color matching areas of the first map image data and the second map image data, wherein the border features include geometric features of the borders,
   a feature point finding unit which extracts feature points of the common areas of the first map image data and the second map image data, and
   a map combining unit which combines the first map image data and the second map image data according to the feature points.

8. The image processing apparatus of the claim 7, wherein the image processing apparatus further comprises an image reading unit which obtains the first map image data and the second map image data.

9. The image processing apparatus of the claim 8, wherein the image reading unit is an image scanner which scans original map images and obtains the first map image data and the second map image data.

10. The image processing apparatus of the claim 7, wherein the image processing apparatus further comprises a print unit which prints a combined map image in which the first map image data and the second map image data are combined by the map combining unit.

* * * * *